United States Patent
Liu et al.

(10) Patent No.: US 11,656,378 B2
(45) Date of Patent: May 23, 2023

(54) SEISMIC IMAGING BY VISCO-ACOUSTIC REVERSE TIME MIGRATION

(71) Applicant: Saudi Arabian Oil Company, Dhahran (SA)

(72) Inventors: Hongwei Liu, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 250 days.

(21) Appl. No.: 16/895,762

(22) Filed: Jun. 8, 2020

(65) Prior Publication Data
US 2021/0382192 A1    Dec. 9, 2021

(51) Int. Cl.
*G01V 1/30*    (2006.01)
*G01V 1/18*    (2006.01)
(Continued)

(52) U.S. Cl.
CPC .............. *G01V 1/301* (2013.01); *G01V 1/181* (2013.01); *G01V 1/282* (2013.01); *G01V 1/345* (2013.01);
(Continued)

(58) Field of Classification Search
CPC ........ G01V 1/181; G01V 1/282; G01V 1/301; G01V 1/32; G01V 1/345; G01V 2210/14;
(Continued)

(56) References Cited

U.S. PATENT DOCUMENTS

| 493,339 A | 3/1893 | Phillips |
|---|---|---|
| 1,028,012 A | 5/1912 | Foster |

(Continued)

FOREIGN PATENT DOCUMENTS

| CN | 101105537 | 1/2008 |
|---|---|---|
| EP | 0109341 | 2/1991 |

(Continued)

OTHER PUBLICATIONS

Yang, A new time-domain wave equation for viscoacoustic modeling and imaging, SEG International Exposition, 2018 (Year: 2018).*

(Continued)

*Primary Examiner* — Kyle R Quigley
(74) *Attorney, Agent, or Firm* — Fish & Richardson P.C.

(57) ABSTRACT

A method for generating a seismic image representing a subsurface includes receiving seismic data for the subsurface formation, including receiver wavelet data and source wavelet data. Source wavefield data are generated based on a forward modeling of the source wavelet data. Receiver wavefield data are generated that compensate for distortions in the seismic data by: applying a dispersion-only model to the receiver wavelet data to generate a first reconstructed back-propagated receiver wavefield portion, applying a dissipation-only model to the receiver wavelet data to generate a second reconstructed back-propagated receiver wavefield portion, and combining the first back-propagated receiver wavefield portion and the second back-propagated receiver wavefield portion into the receiver wavefield data. The method includes applying an imaging condition to the receiver wavefield data and the source wavefield data and generating, based on applying the imaging condition, visco-acoustic reverse time migration (VARTM) result data.

17 Claims, 8 Drawing Sheets

(51) Int. Cl.
*G01V 1/28* (2006.01)
*G01V 1/34* (2006.01)
(52) U.S. Cl.
CPC ...... *G01V 2210/14* (2013.01); *G01V 2210/43* (2013.01); *G01V 2210/642* (2013.01)
(58) Field of Classification Search
CPC ......... G01V 2210/43; G01V 2210/512; G01V 2210/582; G01V 2210/584; G01V 2210/614; G01V 2210/642; G01V 2210/679
See application file for complete search history.

(56) References Cited

U.S. PATENT DOCUMENTS

| | | | |
|---|---|---|---|
| 3,441,631 A | 4/1969 | Fernald et al. | |
| 3,502,741 A | 3/1970 | Fernald et al. | |
| 3,688,249 A | 8/1972 | Backus et al. | |
| 3,691,529 A | 9/1972 | Pizante | |
| 3,753,222 A | 8/1973 | Trostle et al. | |
| 4,449,208 A | 5/1984 | Moeckel et al. | |
| 4,562,540 A | 12/1985 | Devaney | |
| 4,935,904 A | 6/1990 | Chambers et al. | |
| 5,021,891 A | 6/1991 | Lee | |
| 5,292,837 A | 3/1994 | Heinrich et al. | |
| 5,297,236 A | 3/1994 | Antill et al. | |
| 5,367,385 A | 11/1994 | Yuan | |
| 5,719,958 A | 2/1998 | Wober et al. | |
| 5,793,898 A | 8/1998 | Nakamoto | |
| 6,160,919 A | 12/2000 | Hale | |
| 6,370,477 B1 | 4/2002 | Vermeer | |
| 6,767,975 B1 | 7/2004 | Liu | |
| 7,085,195 B2 | 8/2006 | Taner et al. | |
| 7,157,532 B2 | 1/2007 | Payer et al. | |
| 7,196,969 B1 | 3/2007 | Karazincir | |
| 7,373,252 B2 | 5/2008 | Sherrill et al. | |
| 7,643,377 B1 | 1/2010 | Uzes | |
| 8,116,168 B1 | 2/2012 | Luo et al. | |
| 8,120,991 B2 | 2/2012 | Koren et al. | |
| 8,209,126 B2 | 6/2012 | Berkovitch | |
| 8,227,653 B2 | 7/2012 | Weber et al. | |
| 8,315,124 B2 | 11/2012 | Zhu | |
| 9,116,255 B2 | 11/2012 | Eick et al. | |
| 8,531,914 B2 | 9/2013 | Delpart-Jannaud | |
| 8,760,967 B2 | 6/2014 | Nichols et al. | |
| 8,948,463 B2 | 2/2015 | Landa | |
| 9,536,143 B2 | 8/2015 | Jiang et al. | |
| 9,128,205 B2 | 9/2015 | Guan et al. | |
| 9,395,457 B2 | 7/2016 | Poole | |
| 9,568,627 B2 | 2/2017 | Guigne et al. | |
| 9,702,997 B2 | 7/2017 | Sava et al. | |
| 9,702,999 B2 | 7/2017 | Sun et al. | |
| 9,724,681 B2 | 8/2017 | Lucciulli et al. | |
| 9,726,771 B1 | 8/2017 | Popovici et al. | |
| 9,880,303 B2 | 1/2018 | Landa et al. | |
| 9,896,392 B2 | 2/2018 | Meiswinkel et al. | |
| 9,919,298 B2 | 3/2018 | Schmidt et al. | |
| 10,022,698 B2 | 7/2018 | Shaik et al. | |
| 10,228,476 B2 | 3/2019 | Xie et al. | |
| 10,232,339 B2 | 3/2019 | Bischof et al. | |
| 10,280,125 B2 | 5/2019 | Sogo et al. | |
| 10,295,685 B2 | 5/2019 | Zhang et al. | |
| 10,310,122 B2 | 6/2019 | Haacke et al. | |
| 10,324,204 B1 | 6/2019 | Sturzu et al. | |
| 10,324,205 B2 | 6/2019 | Wang et al. | |
| 2004/0243312 A1 | 12/2004 | Schonewille | |
| 2010/0097888 A1 | 4/2010 | Neelamani et al. | |
| 2010/0131205 A1 | 5/2010 | Berkovitch et al. | |
| 2010/0171740 A1 | 7/2010 | Andersen | |
| 2010/0212909 A1 | 8/2010 | Baumstein | |
| 2010/0232723 A1 | 9/2010 | Averbuch et al. | |
| 2012/0004849 A1 | 1/2012 | Aarre | |
| 2012/0051176 A1 | 3/2012 | Liu | |
| 2013/0060476 A1 | 3/2013 | Thomson | |
| 2013/0176819 A1 | 7/2013 | Poole | |
| 2014/0032119 A1 | 1/2014 | Landa | |
| 2014/0088879 A1 | 3/2014 | Hennenfent | |
| 2014/0149046 A1 | 5/2014 | Baina et al. | |
| 2014/0269185 A1 | 9/2014 | Ferber | |
| 2014/0293744 A1 | 10/2014 | Zhang | |
| 2014/0328140 A1 | 11/2014 | Khalil et al. | |
| 2015/0112601 A1 | 4/2015 | Ozbek | |
| 2015/0124559 A1 | 5/2015 | Cha et al. | |
| 2015/0170411 A1 | 6/2015 | Thomas | |
| 2015/0276956 A1* | 10/2015 | Khalil | G01V 1/28 702/16 |
| 2015/0355355 A1 | 12/2015 | Guan et al. | |
| 2015/0362622 A1* | 12/2015 | Denli | G01V 99/005 703/2 |
| 2016/0109595 A1 | 4/2016 | Stork | |
| 2016/0170059 A1* | 6/2016 | Ramos-Martinez | G01V 1/368 367/7 |
| 2016/0291178 A1 | 10/2016 | Xie et al. | |
| 2016/0325274 A1 | 11/2016 | Schmidt | |
| 2016/0327661 A1 | 11/2016 | Mousa | |
| 2016/0330486 A1 | 11/2016 | Said | |
| 2016/0334526 A1 | 11/2016 | Pica | |
| 2016/0341837 A1 | 11/2016 | Eick | |
| 2016/0367977 A1 | 12/2016 | Shaikh et al. | |
| 2017/0006288 A1 | 1/2017 | Boitard et al. | |
| 2017/0097428 A1 | 4/2017 | Sun | |
| 2017/0192118 A1 | 7/2017 | Du et al. | |
| 2017/0197892 A1 | 7/2017 | Khawaji | |
| 2017/0371050 A1 | 12/2017 | Sun et al. | |
| 2018/0120464 A1 | 5/2018 | Sun et al. | |
| 2018/0143334 A1 | 5/2018 | Hegna et al. | |
| 2018/0143337 A1 | 5/2018 | Koren et al. | |
| 2018/0180755 A1 | 6/2018 | Yan | |
| 2018/0364374 A1 | 12/2018 | Brenders et al. | |
| 2019/0018155 A1 | 1/2019 | Nakshatrala et al. | |
| 2019/0092707 A1 | 3/2019 | Melibari et al. | |
| 2019/0179045 A1 | 6/2019 | Zhang et al. | |

FOREIGN PATENT DOCUMENTS

| | | |
|---|---|---|
| EP | 1508058 | 2/2005 |
| EP | 2294824 | 3/2011 |
| EP | 3029491 | 6/2016 |
| GB | 2483997 | 3/2012 |
| GB | 2525072 | 10/2015 |
| GB | 2530126 | 3/2016 |
| JP | H879754 | 3/1996 |
| JP | H11511632 | 10/1999 |
| JP | 2004120748 | 4/2004 |
| JP | 2005231077 | 9/2005 |
| JP | 2011503533 | 1/2011 |
| JP | 2011509412 | 3/2011 |
| WO | WO 9850886 | 11/1998 |
| WO | WO 2011154762 | 12/2011 |
| WO | WO 2012051267 | 4/2012 |
| WO | WO 2015051267 | 4/2015 |
| WO | WO 2016156530 | 10/2016 |
| WO | 2490584 | 4/2017 |
| WO | WO 2018187461 | 10/2018 |
| WO | WO 2019055565 | 3/2019 |

OTHER PUBLICATIONS

Canadian office action in Canadian Appln. No. CA 3059749, dated Jan. 4, 2020, 12 pages.
CN Office Action in Chinese Appln. No. 201880038522.7, dated Oct. 19, 2021, 7 pages, with English Translation.
Chinese Office Action in Chinese Appln. No. 201880038522.7, dated Dec. 22, 2020, 17 pages, with English Translation.
Bahorich and Farmer, "3D Seismic Discontinuity for Faults and Stratigraphic Features: the Coherence Cube," The Leading Edge, 1995, vol. 14, 6 pages.
Batany et al., "Adaptive multiple subtraction: Unification and Comparison of matching filters based on the lq-norm and statistical independence," Geophysics, Jan.-Feb. 2016, 81(1), 13 pages.

(56) References Cited

OTHER PUBLICATIONS

Berkhout and Verschuur, "Estimation of multiple scattering by iterative inversion, Part I: Theoretical considerations," Geophysics, Sep.-Oct. 1997, vol. 62, No. 5, 10 pages.

Bradley et al., "The FBI Wavelet/Scalar Quantization Standard for gray-scale fingerprint image compression," Visual Information Processing II, Apr. 1993, 1961:293-304.

Chen and Fomel, "Random noise attenuation using local signal-and-noise orthogonalization," Geophysics, 2015, vol. 80, No. 6, WD1-WD9, 19 pages.

Chen et al., "Directly imaging steeply-dipping fault zones in geothermal fields with multicomponent seismic data," Geothermics, Sep. 2015, vol. 57, 31 pages.

Donno, "Improving multiple removal using least-squares dip filters and independent component analysis," Geophysics, Sep.-Oct. 2011, vol. 76, No. 5, 14 pages.

Donno et al., "Curvelet-based multiple prediction," Geophysics, Nov.-Dec. 2010, vol. 75, No. 6, 9 pages.

Fei et al., "An Endemic Problem in Reverse-Time Migration," 84th Annual International Meeting, SEG, Expanded Abstracts, 2014, pp. 3811-3815.

Fei et al., "Removing False Images in Reverse-Time Migration: The Concept of De-Primary," Geophysics, Nov.-Dec. 2015, 80(6): S237-S244.

Fletcher, "Suppressing Unwanted Internal Reflections in Prestack Reverse-Time Migration," Geophysics, Nov.-Dec. 2006, vol. 71, No. 6, pp. E79-E82.

Fomel, "Shaping regularization in geophysical-estimation problems," Geophysics, vol. 72, No. 2, Mar.-Apr. 2007, 8 pages.

Fomel, "Theory of 3-D Angle Gathers in Wave-Equation Imaging," 74th Annual International Meeting, SEG, Expanded Abstracts, Oct. 2004, pp. 1053-1056.

Forestiere et al., "Oligomerization of Monoolefins by Homogenous Catalysts," Oil & Science and Technology Review de l'Institute Francais du Petrole, vol. 64, No. 6, Nov. 2009, pp. 663-664.

Guitton and Verschuur, "Adaptive subtraction of multiples using the L1-norm," Geophysical Prospecting, vol. 52, Issue 1, Jan. 2004, 12 pages.

Guitton, "Multiple attenuation in complex geology with a pattern-based approach," Geophysics, vol. 70, No. 4, Jul.-Aug. 2005, 11 pages.

Herrmann et al., "Non-linear primary-multiple separation with directional curvelet frames," Geophysical Journal International, vol. 170, Issue 2, Aug. 2007, 19 pages.

Hu et al., "Angle gathers from reverse time migration using analytic wavefield propagation and decomposition in the time domain," Geophysics, vol. 81, No. 1, Jan. 1, 2016, 9 pages.

Jawerth and Sweldens, "Biorthogonal Smooth Local Trigonometric Bases," the Journal of Fourier Analysis and Applications, vol. 2, No. 2, Apr. 1995, 25 pages.

Jawerth and Sweldens, "Signal compression with smooth local trigonometric bases," Optical Engineering, vol. 33, Issue 7, Jul. 1994, 11 pages.

Jiang, "Seismic imaging strategies for visco-acoustic full waveform inversion," Earth Sciences, PSL, Research University, 2019, 213 pages.

Khaidukov et al., "Diffraction imaging by focusing-defocusing: An outlook on seismic superresolution," Geophysics, vol. 69, No. 6, Nov.-Dec. 2004, 13 pages.

Kim et al., "3D Least-Squares Reverse Time Migration Using Wavefield Decomposition via Hilbert transform," 79th EAGE Conference & Exhibition, Jun. 12, 2017, 5 pages.

Kim et al., "Increasing signal-to-noise ratio of marine seismic data: a case study from offshore Korea," Journal of Applied Geophysics, Nov. 2016, 134:136-145.

Klokov et al., "Separation and imaging of seismic diffractions using migrated dip-angle gathers," Geophysics, vol. 77, No. 6, S131-S143.

Kong et al., "Diffraction separation by plane-wave prediction filtering," Chinese Geophysical Society, Appl. Geophys., Jul. 2017, 14:399.

Landa et al., "Separation, imaging and velocity analysis of seismic diffractions using migrated dip-angle gathers," 78th Annual International Meeting, SEG, Expanded Abstracts, 2008, 5 pages.

Li and Lu, "Demultiple strategy combining Radon filtering and Radon domain adaptive multiple subtraction," Journal of Applied Geophysics, vol. 103, Apr. 2014, 11 pages.

Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.

Liu et al., "An Effective Imaging Condition for Reverse-Time Migration using Wavefield Decomposition," Geophysics, vol. 76, No. 1, Jan. 2011, pp. S29-S39.

Liu et al., "Imaging diffractors using wave-equation migration," Geophysics, vol. 81, No. 6, Nov.-Dec. 2016, 10 pages.

Liu et al., "Reverse-Time Migration using One-Way Wavefield Imaging Condition," 77th Annual International Meeting, SEG Expanded Abstracts, 2007, pp. 2170-2174.

Luo et al., "Edge-preserving smoothing and applications," The Leading Edge, vol. 21, 2002, 5 pages.

Mahdaviani et al., "Selective Ethylene Dimerization Toward 1-butene by a New Highly Efficient Catalyst System and Determination of Its Optimum Operating Conditions in a Buchi Reactor," International Journal of Chemical Engineering and Applications, vol. 1, No. 3, Oct. 2010, pp. 276-281, 6 pages.

Mahmoudian et al., "Angle-domain CIG: A review of angle domain common image gathers," CREWES Research Report—vol. 1, Jan. 1, 2009, 22 pages.

Malvar, "Lapped Transforms for Efficient Transform/Subband Coding," IEEE Transaction on Acoustics, Speech, and Signal Processing, vol. 38, No. 6, Jun. 1990, 10 pages.

Malvar, "The LOT: Transform Coding Without Blocking Effects," IEEE Transactions on Acoustics, Speech, and Signal Processing, vol. 37, No. 4, Apr. 1989, 7 pages.

Popovici et al., "High resolution diffraction imaging of small scale fractures in shale and carbonate reservoirs," Unconventional Resources Technology Conference, 2015, 9 pages.

Princen and Bradley, "Analysis/Synthesis Filter Bank Design Based on Time Domain Aliasing Cancellation," IEEE Transaction on Acoustics, Speech and Signal Processing, vol. ASSP-34, No. 5, Oct. 1986, 9 pages.

Qin et al., "Kirchhoff preSDM interactive dip-gather stacking and dip illumination panel generation," 75th Annual International Meeting, SEG, Expanded Abstracts, 2005, 5 pages.

Rickett et al., "P167—Adaptive multiple subtraction with non-stationary helical shaping filters," EAGE 63rd Conference and Technical Exhibition, Jun. 11-15, 2001, 4 pages.

Sava et al. "Angle-Domain Common Image Gathers by Wavefield Continuation Methods," Geophysics, 68, May-Jun. 2003, pp. 1065-1074.

Schoepp et al., "Multifocusing 3D diffraction imaging for detection of fractured zones in mudstone reservoirs: Case history," Interpretation, Feb. 2015, 3(1), 12 pages.

Shen et al., "Azimuthal offset-dependent attributes applied to fracture detection in a carbonate reservoir," Geophysics, Mar.-Apr. 2002, 67(2):355-364.

Singh, "An Algorithm for Improving the Quality of Compacted JPEG Image by Minimizes the Blocking Artifacts," International Journal of Computer Graphics and Animation, vol. 2, No. 2, Jul. 31, 2012, 19 pages.

Spitz, "Pattern recognition, spatial predictability and subtraction of multiple events," the Leading Edge, Jan. 1999, 4 pages.

Sturzu et al., "Diffraction imaging using specularity gathers," Journal Seismic Exploration, vol. 23, Feb. 2014, 18 pages.

Sun et al., "Comparative study of dip-angle domain Gaussian beam migration and Kirchhoff migration in diffraction separation," SEG Technical Program Expanded Abstracts, 2014, 5 pages.

Sun et al., "Q-compensated least-squares reverse time migration using low-rank one-step wave extrapolation," Geophysics, vol. 81, No. 4, Jul.-Aug. 2016, 9 pages.

(56) References Cited

OTHER PUBLICATIONS

Taner et al., "Separation and imaging of seismic diffractions using plane-wave decomposition," SEG Technical Program Expanded Abstracts, Jan. 2006, 25(1):2401-2405.
Van Veldhuizen, "Integrated approach to 3-D seismic acquisition geometry analysis," Technische Universiteit Delft, Sep. 2006, 192 pages.
Ventosa et al., "Adaptive multiple subtraction with wavelet-base complex urary Wiener filters," Jun. 2018, Geophysics, vol. 77, Nov.-Dec. 2012, 18 pages.
Verschuur et al., "Adaptive surface-related multiple elimination," Geophysics, vol. 57, No. 9, Sep. 1992, 12 pages.
Wallace, "The JPEG Still Picture Compression Standard," Communications of the ACM, Apr. 1991, submitted in Dec. 1991 for publication in IEEE Transactions for Consumer Electronics, 17 pages.
Wang et al., "RTM Artifact Removal Via a Fast Algorithm for Wavefield Decomposition," 2016 SEG International Exposition and 86th Annual Meeting, 2016, 1 page.
Wang et al., "Seismic wave imaging in visco-acoustic media," Science in China Ser. A Mathematics, 2004, vol. 47, 146-154, 9 pages.
Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 1, 2016, 15 pages.
Wang, "Multiple subtraction using an expanded multichannel matching filter," Geophysics, vol. 68, No. 1, Jan.-Feb. 2003, 9 pages.
Wiggins, "Multiple attenuation by explicit wave extrapolation to an interpreted horizon," the Leading Edge, Jan. 1999, 7 pages.
Wood, "Seismic Data Compression Methods," Geophysics, vol. 39, No. 4, Aug. 1974, 27 pages.
Xu et al., "3D Angle Gathers from Reverse-Time Migration," Geophysics, vol. 76, No. 2, Mar.-Apr. 2011, pp. S77-S92.
Xue et al., "Amplitude-preserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.
Yeo and Liu, "Volume Rendering of DCT-Based Compressed 3D Scalar Data," IEEE Transaction on Visualization and Computer Graphics, vol. 1, No. 1, Mar. 1995, 15 pages.
Zhang and Zhang, "Diffraction imaging using shot and opening angle gathers: A prestack time migration approach," Geophysics, vol. 79, No. 2, Mar.-Apr. 2014, 11 pages.
Zhang et al., "Improving reverse time migration angle gathers by efficient wavefield separation", Geophysics, vol. 83, No. 2, Mar. 2018, pp. S187-S195.
Zhang et al., "RTM angle gathers by optical flow with wavefield separation", SEG Technical Program Expanded Abstracts, Aug. 27, 2018, 5 pages.
Zhang et al., "Compensating for visco-acoustic effects in reverse-time migration," SEG Denver 2010 Annual Meeting, 2010, 5 pages.
Zhang et al., "Efficient Wave-Equation-Based Diffraction Imaging," Geophysics, vol. 82, No. 5, Sep.-Oct. 2019, 11 pages.
Zhang, "RTM Angle Gathers and Specular Filter (SF) RTM using Optical Flow," 84rd Annual International Meeting, SEG, Expanded Abstracts, 2014, pp. 3816-3820.
Zhao et al., "A stable and efficient approach of Q reverse time migration," Geophysics, vol. 83, No. 6, Nov.-Dec. 2018, 11 pages.
Zhao et al., "A stable approach for Q-compensated viscoelastic reverse time migration using excitation amplitude imaging condition," Geophysics, vol. 83, No. 5, Sep.-Oct. 2018, 18 pages.
Zhao et al., "Postprocessing technique for blocking artifacts reductions in DCT domain," Electronics Letters, vol. 40, No. 19, Jan. 2004, 2 pages.
Australian Examination Report in Australian Appln. No. 2018251796, dated Jul. 9, 2020, 9 pages.
Gulf Cooperation Council Examination Report issued in GCC Appln. No. GC 2018-35127 dated Oct. 27, 2019, 4 pages.
International Search Report and Written Opinion issued in International Application No. PCT/US2018/027117 dated Jul. 23, 2018, 16 pages.
Liu et al., "A generalized time-domain equation based on the constant-Q theory for visco-acoustic wave simulation." SEG Technical Program Expanded Abstracts 2020. Society of Exploration Geophysicists, Sep. 2020, 2633-2637, 5 pages.
Yang et al., "A new time-domain wave equation for viscoacoustic modeling and imaging." SEG Technical Program Expanded Abstracts 2018. Society of Exploration Geophysicists, Aug. 2018, 3793-3797, 5 pages.
PCT International Search Report and Written Opinion in International Appln. No. PCT/US2021/036155, dated Sep. 24, 2021, 20 pages.
JP Office action in Japanese Appln. No. JP 2019-555781, dated Feb. 2, 2021, 15 pages, with English Translation.
CN Office Action in Chinese Appln. No. 201880038522.7, dated Jun. 11, 2021, 7 pages, with English Translation.

* cited by examiner

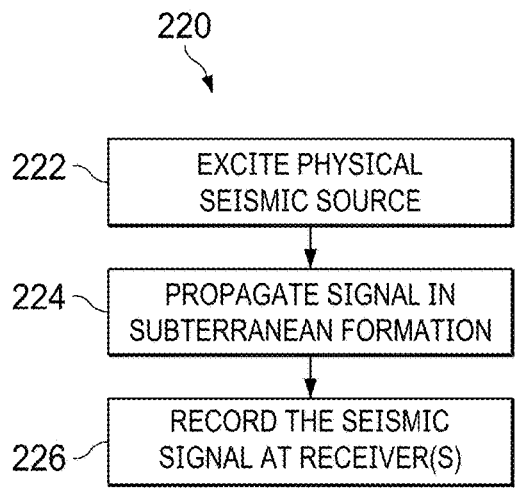
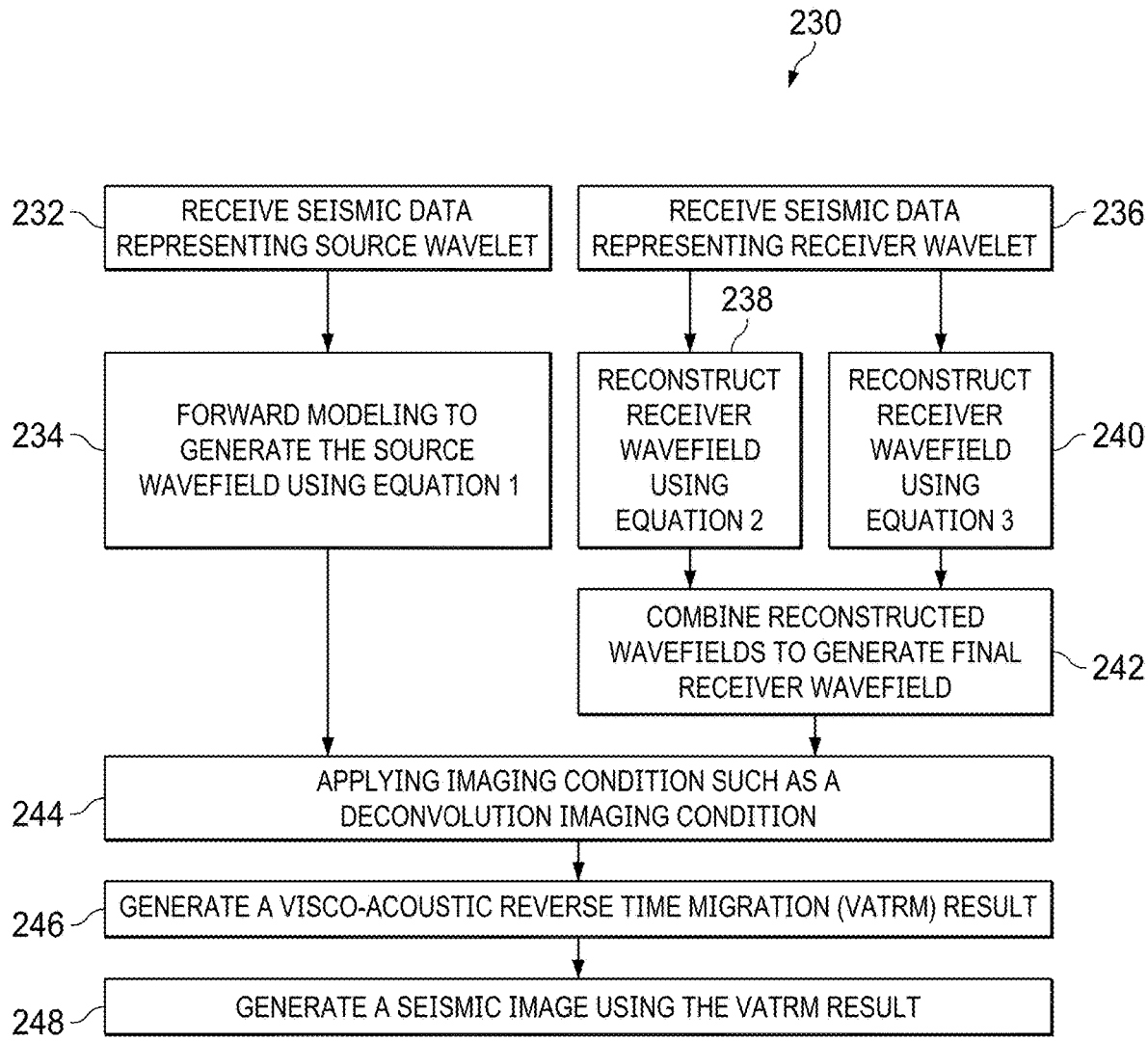

SEISMIC IMAGING BY VISCO-ACOUSTIC REVERSE TIME MIGRATION

TECHNICAL FIELD

The present disclosure generally relates to an approach for identifying geologic features in a subsurface formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from other sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

Seismic images can be viewed as photographs for underground layers of rocks. Seismic images can be generated by measuring different probing elastic waves. Various images can made from the echoes of these waves that reflect different rock properties. However, as media complexity becomes more complex, inaccuracies can be introduced to velocity model in seismic data. This is because seismic imaging can be based on an acoustic assumption. This assumption is that the seismic wave signal does not have physical dispersion or amplitude dissipation except for the spherical diffusion. In reality, a property of the Earth is that it is anelastic, and seismic signals are distorted during the wave propagation because of a viscosity of the seismic environment. To compensate these distortions, an inverse-Q filter can be applied during a data processing stage of the seismic data. In some implementations, a more advanced compensation technique is to incorporate the compensation during seismic inversion and imaging.

This specification describes a stable visco-acoustic imaging technology based on the de-coupled time-domain complex-valued wave equation. The de-coupled visco-acoustic wave equations are applied for wavefield reconstruction, and the final seismic image accounts for effects for both attenuation and velocity dispersion. More specifically, decoupled visco-acoustic wave equations are applied for wavefield reconstruction by an imaging condition-based combination of a source wavefield generated by forward modeling and a receiver wavefield generated by combining two receiver wavefields generated from observed data to provide a final seismic image that accounts for both attenuation and velocity dispersion.

In a general aspect, a process for generating a seismic image representing a subsurface formation by compensating for distortions of seismic data includes receiving seismic data for the subsurface formation, including receiver wavelet data and source wavelet data. The process includes generating source wavefield data based on a forward modeling of the source wavelet data. The process includes generating receiver wavefield data that compensates for distortions in the seismic data by: applying a dispersion-only model to the receiver wavelet data to generate a first reconstructed back-propagated receiver wavefield portion; applying a dissipation-only model to the receiver wavelet data to generate a second reconstructed back-propagated receiver wavefield portion; and combining the first back-propagated receiver wavefield portion and the second back-propagated receiver wavefield portion into the receiver wavefield data. The process includes applying an imaging condition to the receiver wavefield data and the source wavefield data. The process includes generating, based on applying the imaging condition, visco-acoustic reverse time migration (VARTM) result data. The process includes, based on the VARTM result data, generating a seismic image of the subsurface formation.

In a general aspect, a system for generating a seismic image representing a subsurface formation by compensating for distortions of seismic data includes one or more processing devices and a memory in communication with the one or more processing devices, the memory configured to store instructions that, when executed by the one or more processing devices, cause the one or more processing devices to perform operations including receiving seismic data for the subsurface formation, including receiver wavelet data and source wavelet data. The operations include generating source wavefield data based on a forward modeling of the source wavelet data. The operations include generating receiver wavefield data that compensates for distortions in the seismic data by: applying a dispersion-only model to the receiver wavelet data to generate a first reconstructed back-propagated receiver wavefield portion; applying a dissipation-only model to the receiver wavelet data to generate a second reconstructed back-propagated receiver wavefield portion; and combining the first back-propagated receiver wavefield portion and the second back-propagated receiver wavefield portion into the receiver wavefield data. The operations include applying an imaging condition to the receiver wavefield data and the source wavefield data. The operations include generating, based on applying the imaging condition, visco-acoustic reverse time migration (VARTM) result data. The process includes, based on the VARTM result data, generating a seismic image of the subsurface formation.

In a general aspect, one or more non-transitory computer readable media store instructions for generating a seismic image representing a subsurface formation by compensating for distortions of seismic data, instructions configured to cause one or more processing devices that execute the instructions to perform operations comprising receiving seismic data for the subsurface formation, including receiver wavelet data and source wavelet data. The process includes generating source wavefield data based on a forward modeling of the source wavelet data. The process includes generating receiver wavefield data that compensates for distortions in the seismic data by: applying a dispersion-only model to the receiver wavelet data to generate a first reconstructed back-propagated receiver wavefield portion; applying a dissipation-only model to the receiver wavelet data to generate a second reconstructed back-propagated receiver wavefield portion; and combining the first back-propagated receiver wavefield portion and the second back-propagated receiver wavefield portion into the receiver wavefield data. The process includes applying an imaging condition to the receiver wavefield data and the source wavefield data. The process includes generating, based on applying the imaging condition, visco-acoustic reverse time migration (VARTM) result data. The process includes, based on the VARTM result data, generating a seismic image of the subsurface formation.

In an aspect, the systems, processes, and non-transitory computer readable media can each be configured for one or more of the following embodiments. In some implementations, forward modeling of the source wavelet data comprises applying a complex value velocity model to the source wavelet data. In some implementations, the complex velocity model comprises a generalized visco-acoustic wave Equation $$\frac{\partial^2 p_h}{\partial t^2} + v_e^{\frac{2}{1-\gamma}} k^{\frac{2}{1-\gamma}} p_h = s_h(t), \text{ wherein } v_e = \frac{v_0}{\omega_0^\gamma \left[1 - i\tan\left(\frac{\pi\gamma}{2}\right)\right]},$$

wherein $S_h = S + i[-i\,\text{sgn}(\omega)S]$ is the inverse Fourier transform of $s_h(t)$, and wherein $P_h = P + i[-i\,\text{sgn}(\omega)P]$, is the inverse Fourier transform of $p_h(t)$.

In some implementations, the dispersion-only model comprises applying a wave equation to the receiver wavelet, the wave equation comprising:

$$\frac{\partial^2 p}{\partial t^2} + \bar{v}_e^{\frac{2}{1-\gamma}} k^{\frac{2}{1-\gamma}} p = s(t), \text{ where } \bar{v}_e = \frac{v_0}{(\omega_0)^\gamma}.$$

In some implementations, the dissipation-only model comprises applying a wave equation to the receiver wavelet, the wave equation comprising:

$$\frac{\partial^2 p_h}{\partial t^2} + \tilde{v}_e^2 k^2 p_h = s_h(t), \text{ where } \tilde{v}_e = \frac{v_0}{1 - i\tan\left(\frac{\pi\gamma}{2}\right)},$$

where $S_h = S + i[-i\,\text{sgn}(\omega)S]$ is the inverse Fourier transform of $s_h(t)$, and where $P_h = P + i[-i\,\text{sgn}(\omega)P]$ is the inverse Fourier transform of $p_h(t)$.

In some implementations, combining the first back-propagated receiver wavefield portion and the second back-propagated receiver wavefield portion into the receiver wavefield data comprises performing the following combination $$\bar{S}(x_S, \omega) = \left|\frac{S_2(x_S, \omega)}{S_1(x_S, \omega)}\right| S_2(x_S, \omega),$$

where $S_1(x_S,\omega) = e^{(i\varphi)} e^{-2\alpha(\omega)r} S(x_S,\omega)$ comprises the first reconstructed back-propagated receiver wavefield portion and wherein $S_2(x_S,\omega) = e^{-\alpha(\omega)r} S(x_S,\omega)$ comprises the second reconstructed back-propagated receiver wavefield portion. In some implementations, the imaging condition comprises a deconvolution imaging condition.

The data processing system and processes described can enable one or more of the following advantages. Generally, a seismic wave propagation has anelastic characteristics in real earth materials. In exploration geophysics, the recorded signals are significantly affected by the attenuation property in both amplitude and phase. The data processing system is able to account for the effects of attenuation and velocity dispersion to generate an accurate seismic image. This prevents distortions in a final seismic image and reduces drilling hazards. Thus, the data processing system is configured for to depth domain seismic data processing and velocity model building to overcome amplitude attenuation and velocity dispersion for seismic imaging.

The details of one or more embodiments are set forth in the accompanying drawings and the description below. Other features and advantages will be apparent from the description and drawings, and from the claims.

BRIEF DESCRIPTION OF THE DRAWINGS

FIGS. 2A-2B are example processes for seismic imaging using visco-acoustic reverse time migration.

DETAILED DESCRIPTION

This specification describes a stable visco-acoustic imaging technology based on the de-coupled time-domain complex-valued wave equation. The de-coupled visco-acoustic wave equations are applied for wavefield reconstruction, and the final seismic image accounts for effects for both attenuation and velocity dispersion. Decoupled visco-acoustic wave equations are applied for wavefield reconstruction by an imaging condition-based combination of a source wavefield generated by forward modeling and a receiver wavefield generated by combining two receiver wavefields generated from observed data to provide a final seismic image that accounts for both attenuation and velocity dispersion.

In some implementations, the process includes generated a result for a Q compensated Reverse Time Migration transform (Q-RTM). Q is as ratio of stored energy to dispersed energy. It measures a relative energy loss per oscillation cycle. Q increases when the density and the velocity of the material of a seismic formation increases. Generally, for the processes subsequently described, a visco-acoustic reverse time migration (VARTM) approach is used instead of ARTM in order to reduce computational complexity, in some cases by at least 50%.

Figure 1:
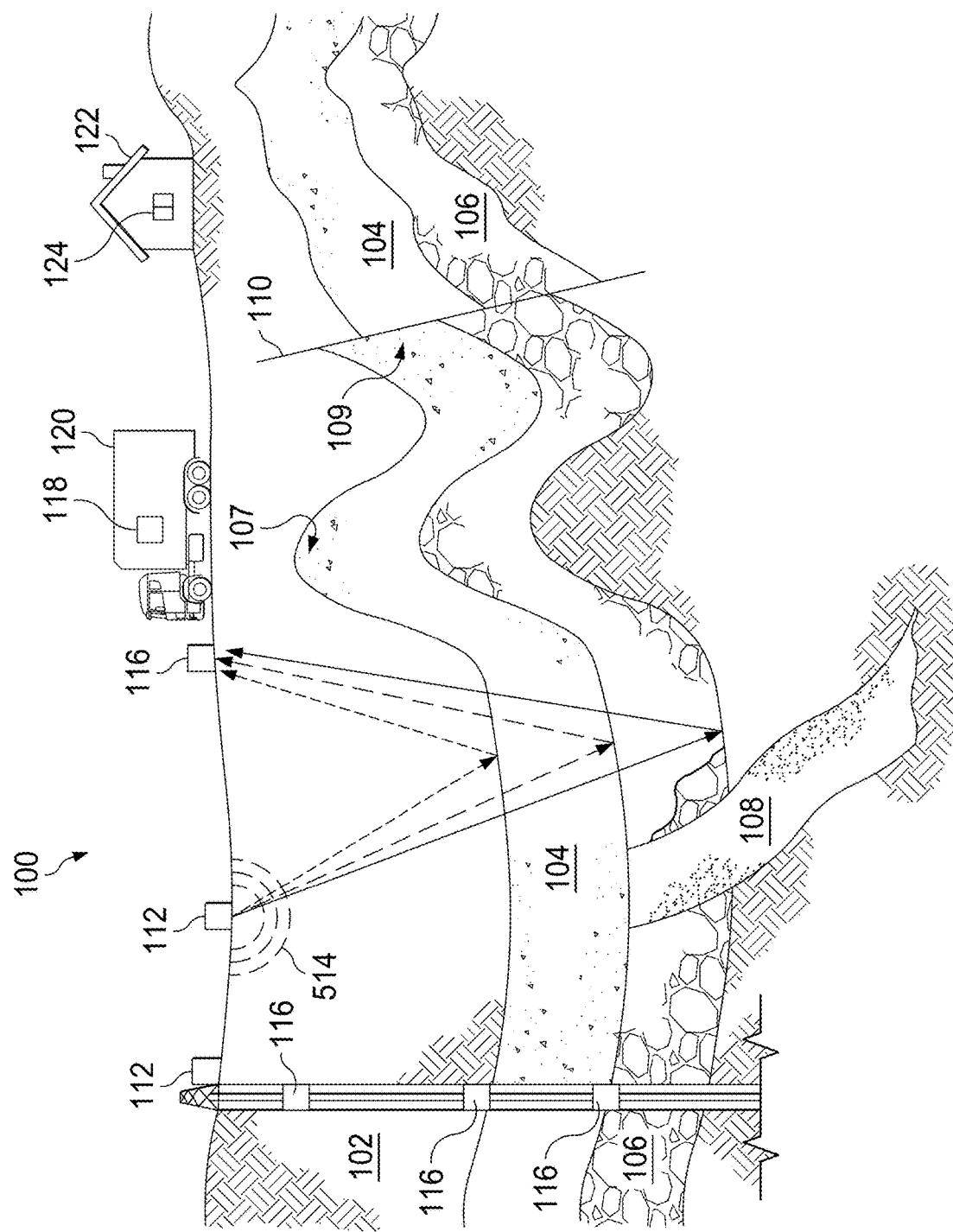
FIG. 1 is a schematic view of a seismic survey being performed to map subsurface features such as facies and faults.

FIG. 1 is a schematic view of a seismic survey being performed to map subsurface features such as facies and faults in a subsurface formation 100. The subsurface formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subsurface formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface. The generated seismic signal at the source is typically located at the ground surface and is sometimes referred to as the ground force.

The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subsurface formation 100, the velocity of seismic waves traveling through the subsurface formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subsurface formation 100. The sensors 116 can be geophone-receivers that produce electrical output signals transmitted as input data, for example, to a computer 118 on a seismic control truck 120.

Based on the input data, the computer 118 may generate a seismic data output, for example, a seismic two-way response time plot.

The seismic surface waves 115 travel more slowly than seismic body waves 114. Analysis of the time it takes seismic surface waves 115 to travel from source to sensor can provide information about near surface features.

In some situations, seismic surveys include vertical seismic profiles, a technique of seismic measurements used for correlation with surface seismic data. In a vertical seismic profile, either the energy source, the detectors, or both are in a wellbore (e.g., wellbore 117). For example, sensors in a well borehole record reflected seismic energy originating from a seismic source at the surface. There are numerous methods for acquiring a vertical seismic profile (VSP). For example, zero-offset VSPs have sources close to the wellbore directly above the sensors; offset VSPs have sources some distance from sensors in a wellbore; and walkaway VSPs feature a source that is moved progressively farther offset from sensors in a fixed location. For example, a zero-offset VSP could be generated by an energy source located at the surface adjacent the wellbore 117 and detectors located downhole in the wellbore 117.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subsurface formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subsurface formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing represent the subsurface formation 100. The seismic cube can also be display results of the analysis of the seismic data associated with the seismic survey.

Figure 3:
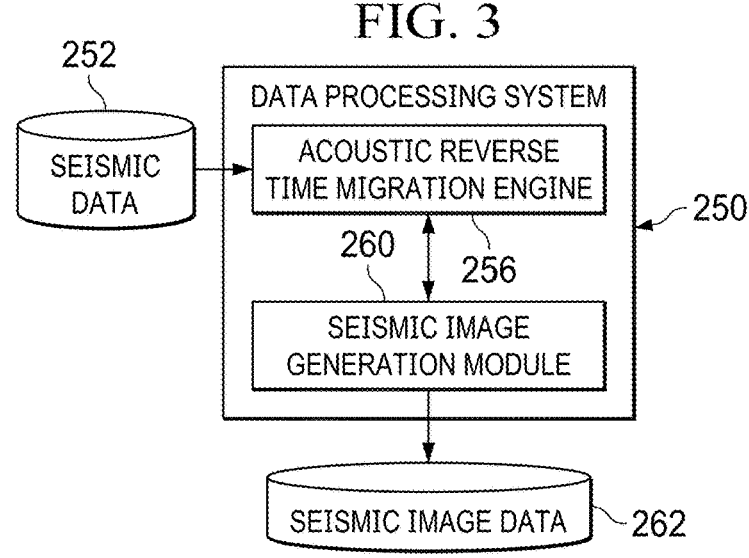
FIG. 3 is a block diagram of an example system for identifying geologic features in a subsurface formation using seismic diffraction imaging

FIGS. 2A-2B illustrate flow diagrams including example processes 220 and 230, respectively, for seismic imaging using visco-acoustic reverse time migration. FIG. 3 shows a data processing system 250 for determining a seismic attenuation factor for near-surface subsurface formations. The data processing system 250 of FIG. 3 is configured to execute the processes 220 and 230 of FIGS. 2A-2B.

FIG. 2A, a process 220 performed by a physical acquisition system (such as a part of system described in relation to FIG. 1) is shown. One or more sources (such as source 112 in the wellbore 117 of FIG. 1) are excited (222) to generate a seismic signal in the formation 100. The seismic signal is propagated (224) through subsurface formation 100 and recorded (226) at receiver(s) (such as receivers 116 in the wellbore 117 of FIG. 1).

As described previously, as the seismic signal propagates in the formation 100, the signal disperses and experiences amplitude dissipation. The data processing system described in this specification is configured to model the amplitude dissipation and the dispersion to perform a correction on the received seismic signal. The data processing system uses the corrected seismic signal to generate a seismic image including a more accurate representation of the formation 100 than seismic images generated using uncorrected seismic signals. The data processing system (such as data processing system 250 of FIG. 3, subsequently described) uses the following visco-acoustic wave equation to model the dispersion and amplitude dissipation.

$$\frac{\partial^2 p_h}{\partial t^2} + v_e^{\frac{2}{1-\gamma}} k^{\frac{2}{1-\gamma}} p_h = s_h(t), \quad (1.1)$$

$$v_e = \frac{v_0}{\omega_0^\gamma \left[1 - i \tan\left(\frac{\pi\gamma}{2}\right)\right]}, \quad (1.2)$$

$$S_h = S + i[-i\,\mathrm{sgn}(\omega)S], \quad (1.3)$$

$$P_h = P + i[-i\,\mathrm{sgn}(\omega)P], \quad (1.4)$$

Equation 1.1 is the generalized visco-acoustic wave equation. $s_h$ and $p_h$ are the inverse Fourier transform of Equations 1.3 and 1.4, respectively. In these equations, $v_e$ represents the complex velocity model, which is a function of the initial velocity $v_0$, $\omega$ represents the angular frequency, t represents time, $\gamma$ is a constant, and k represents the wave number, and p represents the acoustic pressure.

Equation 1.2 shows the complex value velocity model to be used for wave field forward modeling. Based on Equations 1.1, 1.2, 1.3, and 1.4 (collectively Equation 1), an additional two wave equations are derived. Equations 2.1 and 2.2 (collectively Equation 2), is a dispersion-only visco-acoustic wave equation.

$$\frac{\partial^2 p}{\partial t^2} + \bar{v}_e^{\frac{2}{1-\gamma}} k^{\frac{2}{1-\gamma}} p = s(t), \quad (2.1)$$

$$\bar{v}_e = \frac{v_0}{(\omega_0)^\gamma}, \quad (2.2)$$

Equations 3.1 and 3.2 (collectively Equation 3) is a dissipation-only visco-acoustic wave equation.

$$\frac{\partial^2 p_h}{\partial t^2} + \check{v}_e^2 k^2 p_h = s_h(t), \quad (3.1)$$

$$\check{v}_e = \frac{v_0}{1 - i \tan\left(\frac{\pi\gamma}{2}\right)}. \quad (3.2)$$

In each of these equations, $\check{v}_e$ represents the complex velocity model, which is a function of the initial velocity $v_0$, $\omega$ represents the angular frequency, t represents time, $\gamma$ is a constant, and k represents the wave number.

The format of Equation 2.1 is the same as Equation 1.1. However, the Hilbert variables $s_h$ and $p_h$ are replaced by s and p. This indicates that Equation 2.1 represents a model that is computationally less complex than the model shown by Equation 1.1. Equation 2.1 represents a computationally less complex model because there is no need to save complex wavefield values for computation, which is needed for computing a model using Equation 1.1. Generally, the computation and memory usage for models generated using the approach of Equation 2.1 are about 50% lower (for both computation and memory usage) than for models generated using the approach of Equation 1.1.

Additionally, Equation 3.1 includes a similar format as a conventional acoustic wave equation, except that Equation 3.1 includes an imaginary portion including $\check{v}_e$. In other words, when the imaginary portion $\check{v}_e$ is set as zero, Equation 3.1 degenerates to the acoustic wave equation. In comparison to Equations 1.1 and 2.1, Equation 3.1 can be solved by the data processing system with a spatial domain finite difference method. Thus, the solution of Equation 3.1 is less computationally expensive than the spectral domain solved used in Equations 1.1 and 2.1. Generally, if Equation 3.1 is solved in the wavenumber domain, the computational cost is the same as Equation 1.1. If Equation 3.1 is solved in spatial domain, it would be cheaper, because finite difference will be cheaper than spectral method.

Generally, several methods of Reverse Time Migration (RTM) are available for performing the compensation of the seismic signal. In some implementations, a Q-compensated Reverse Time Migration (Q-RTM) can be used. In some implementations, an Acoustic Reverse Time Migration (ARTM) is used. Here, a version of a Visco-Acoustic Reverse Time Migration (VARTM) is applied. Though VARTM and Q-RTM are similar, VARTM is shown for the example implementation.

Compared to the approaches using ARTM, a challenge for VARTM is performing a receiver wavefield back-propagation or reconstruction. The receiver wavefield back propagation is challenging because the amplitude dissipation is compensated during the back-propagation in Equations 4.1, 4.2, and 4.3 (collectively Equation 4). This process can be numerically unstable. In Equation 4.1, $d_h$ is the inverse Fourier transform of Equation 4.3.

$$\frac{\partial^2 p_h}{\partial t^2} + v_e^{\frac{2}{1-\gamma}} k^{\frac{2}{1-\gamma}} p_h = d_h(t), \quad (4.1)$$

$$v_e = \frac{v_0}{\omega_0^\gamma \left[1 + i \tan\left(\frac{\pi\gamma}{2}\right)\right]}, \quad (4.2)$$

$$D_h = D + i\,[-i\,\mathrm{sgn}(\omega)D], \quad (4.3)$$

In these equations, $v_e$ represents the complex velocity model, which is a function of the initial velocity $v_0$, $\omega$ represents the angular frequency, t represents time, $\gamma$ is a constant, D represents the wave equation, and k represents the wave number. $p_h$ is the inverse Fourier transform of Equations 1.4.

To overcome the challenge imparted by numerical instability, the data processing system 250 is configured to execute the process 230 for determining a seismic attenuation factor for near-surface subsurface formations using VARTM. Process 230 is shown in FIG. 2B. The process 230 includes performing a wavefield reconstruction by an imaging condition-based combination of a source wavefield generated by forward modeling and a receiver wavefield generated by combining two receiver wavefields generated from observed data. The recorded signal at the receiver and a numerical representation of the generated signal at the source can be used by the data processing system 250 of FIG. 3 for performing process 230 of FIG. 2B. In an aspect, a data processing system 250 is configured to receive the seismic data 252 and generate seismic image data 262 of the subsurface formation using a series of modules. The data processing system 250 includes an acoustic Reverse Time Migration (RTM) engine 256 and a seismic image generation module 260.

Process 230 of FIG. 2B includes receiving (232), by the data processing system 250, seismic data representing a source wavelet. This seismic signal can be stored as a portion of the seismic data 252. The data processing system 250 is configured to perform a forward modeling (234) of the seismic signal to generate the source wavefield. For the source wavefield modeling, Equation 1 is applied to the seismic signal. The data generated using Equation 1 is the source side synthetic wavefield using a user-specified wavelet. The generated wavefield includes both dispersion and dissipation, and the data is used for the imaging condition.

The data processing system 250 is configured to receive (236) a seismic data representing a receiver wavelet. The data processing system 250 is configured to reconstruct (238, 240) the receiver wavefield in two parts. The data processing system 250 applies Equation 2 to the receiver wavelet for the receiver wavefield reconstruction. This results a back-propagated wavefield using a dissipation-only wave equation. The data processing system 250 also applies Equation 3 to the receiver wavelet for receiver wavefield reconstruction. This results in a back-propagated wavefield using a dispersion-only wave equation. For reconstructions 238, 240, the parameter s is replaced by observed data d of the seismic data.

The data processing system 250 is configured to combine (242) the first and second reconstructed wavefields from Equations 2 and 3. As subsequently shown in Equations 5.1, 5.2, and 5.3 (collectively Equation 5), $S_1$ is the reconstructed wavefield using Equation 2, representing a dissipation-only back-propagated wavefield. $S_2$ is the reconstructed wavefield using Equation 3, representing the dispersion-only back propagated wavefield. The final reconstructed wavefield $\overline{S}$ includes $S_2$ multiplied by the absolute value of $S_2$, divided by $S_1$.

$$S_1(x_S, \omega) = e^{(i\varphi)} e^{-2\alpha(\omega)r} S(x_S, \omega) \quad (5.1)$$

$$S_2(x_S, \omega) = e^{-\alpha(\omega)r} S(x_S, \omega) \quad (5.2)$$

$$\overline{S}(x_S, \omega) = \left|\frac{S_2(x_S, \omega)}{S_1(x_S, \omega)}\right| S_2(x_S, \omega) \quad (5.3)$$

Here, i is the imaginary unit, $\omega$ is the angular frequency, $\alpha$ is a constant, and r is a coordinate. Generally, after the source and receiver wavefields at each image location are reconstructed, a deconvolution imaging condition is applied (244) by the data processing system 250 for the final image process. A VARTM result is generated (246). Generally, this result is similar to a Q-RTM result for generating the seismic image. From this VARTM, the data processing system 250 is configured to generate (248) a seismic image using the VARTM result.

Figure 4:
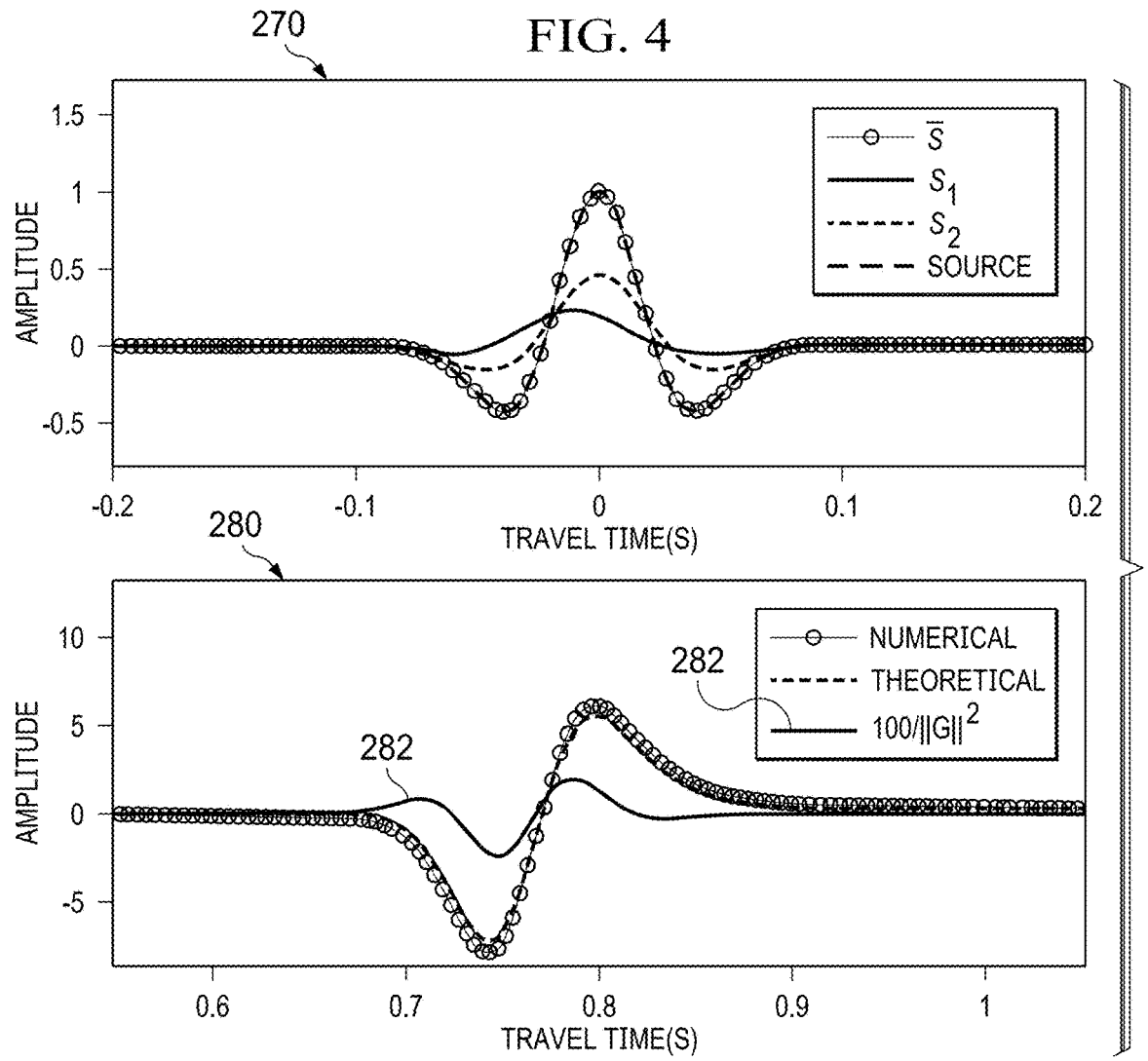
FIG. 4 shows graphs illustrating examples of wavefield reconstruction.

FIG. 4 shows graphs 270 and 280 illustrating examples of wavefield reconstruction using Equations 1, 2, and 3 as described above. Graph 270 of FIG. 4 shows each of $S_1$, $S_2$, and $\overline{S}$, and the source wavelet. As shown in graph 270, the values of the wavefield reconstruction $\overline{S}$ for travel times vs. amplitudes closely approximate the source wavefield. The source wavelet and observed data are shown with an offset of 1.5 km. A shown in graph 280, the theoretical result matches the observed numerical result. The line 282 in graph 280 is the input data for back propagation (amplified 100 times for this visualization). As stated previously, after the source and receiver wavefields at each image location are reconstructed, a deconvolution imaging condition is applied by the data processing system 250 for the final image process.

Generally, the deconvolution imaging condition is defined in Equation 6:

$$I(x) = \int\int \frac{R(x_S, x, \omega)}{S(x_S, x, \omega)} d\omega dx_S \quad (6)$$

Here, $S(x_S,x,\omega)$ is the frequency domain source wavefield generated from Equation 1, and $R(x_S,x,\omega)$ is the frequency domain receiver wavefield generated from Equations 2, 3, and 5.3

Figure 5A:
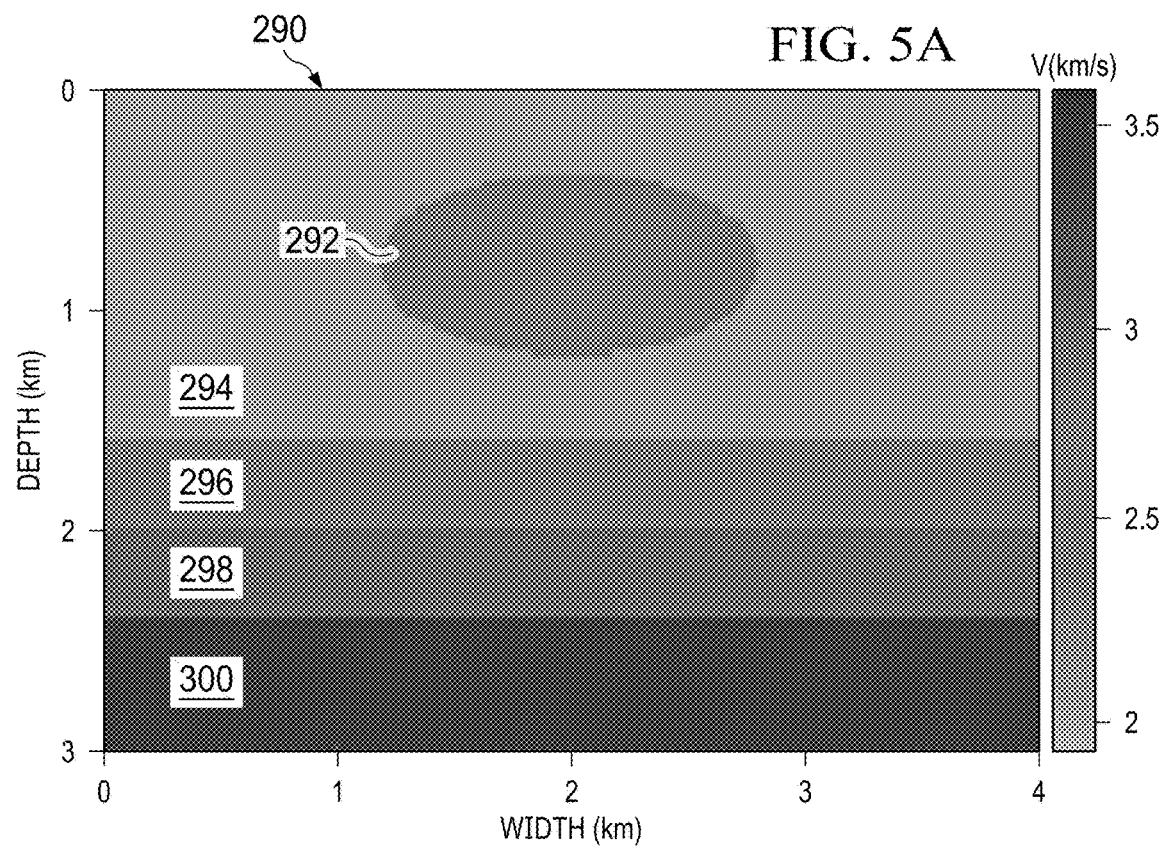
FIGS. 5A-5B show illustrations of a velocity model and attenuation model of an example environment.
Figure 5B:
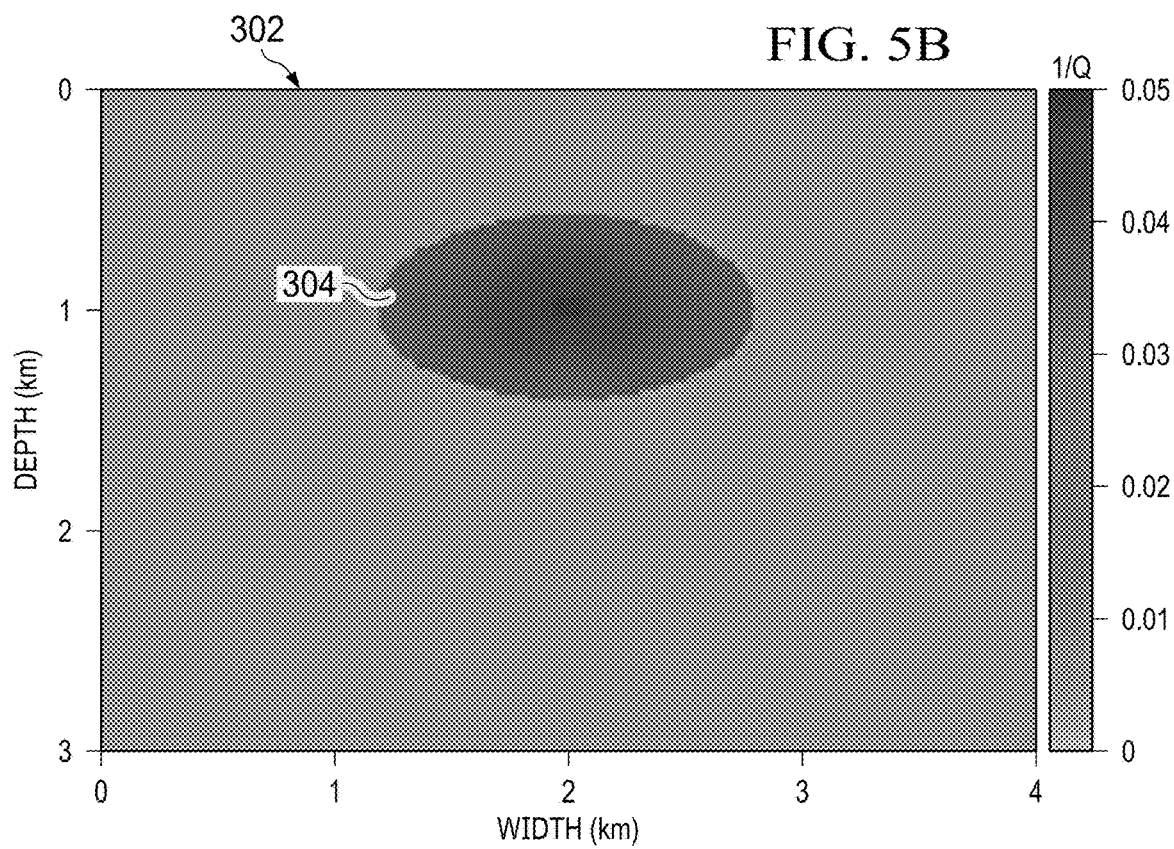

FIGS. 5A-5B show illustrations 290, 302 of a velocity model and attenuation model of an example environment. The velocity model includes a four-layer model including layers 294, 296, 298, and 300. The model includes a lens body 292 inside the first layer which has strong attenuation property, shown in the attenuation data 304 of model 302. This is an example environment for testing the methodology described in relation to FIG. 5B.

Figure 6:
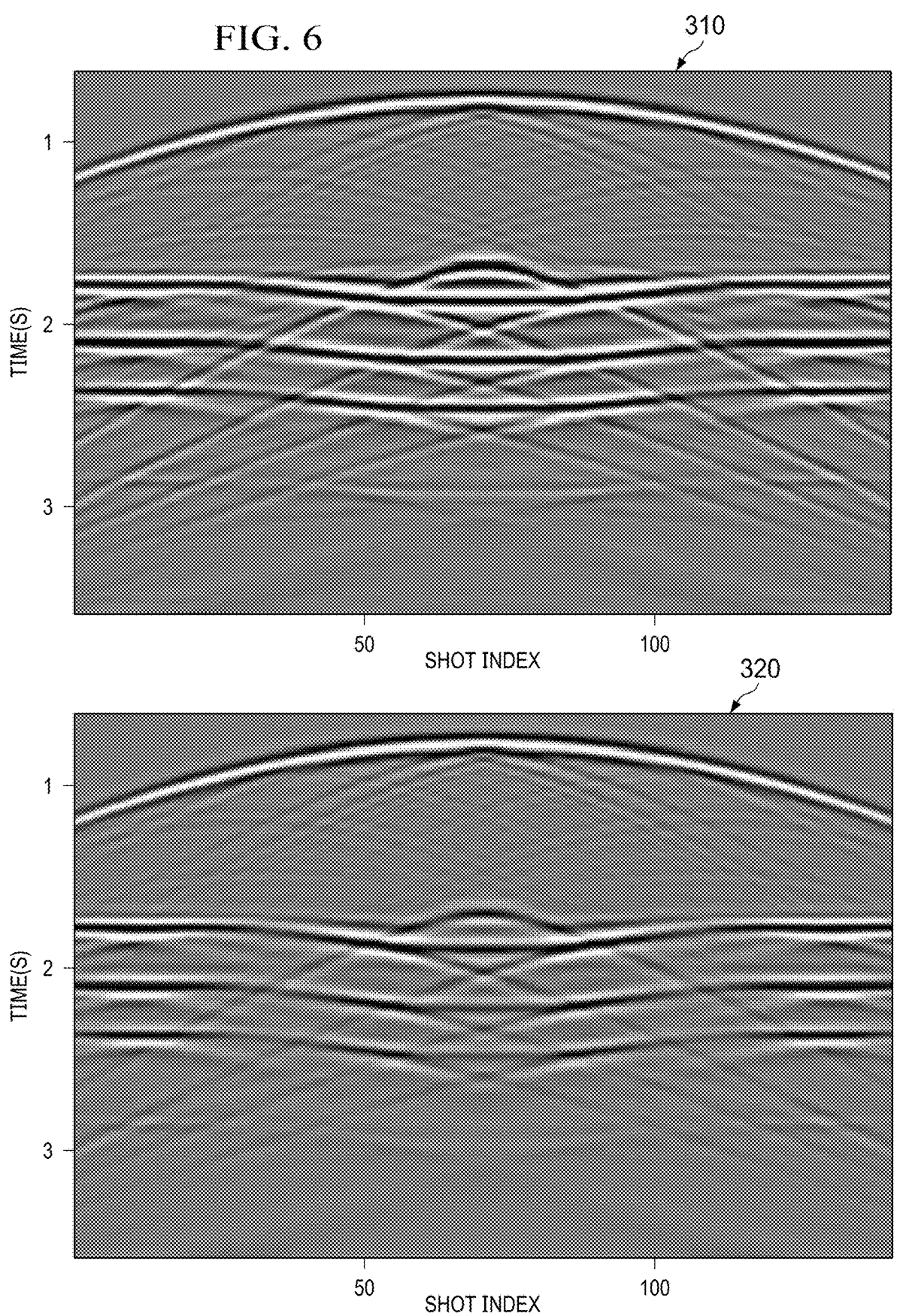
FIG. 6 shows examples of zero-offset profiles generated using acoustic and visco-acoustic forward modeling of the environment of FIGS. 5A-5B.

FIG. 6 shows examples of zero-offset profiles 310 and 320 generated using acoustic and visco-acoustic forward modeling of the environment of FIGS. 8A-8B. The data processing system 250 is configured to perform acoustic and visco-acoustic forward modeling. A plurality of shots (200 shots in this example) are simulated for the visco-acoustic model. The zero-offset profiles 310 and 320. From the comparison, both dispersion and amplitude dissipation of signal caused by the strong attenuation lens body 292 are shown.

Figure 7:
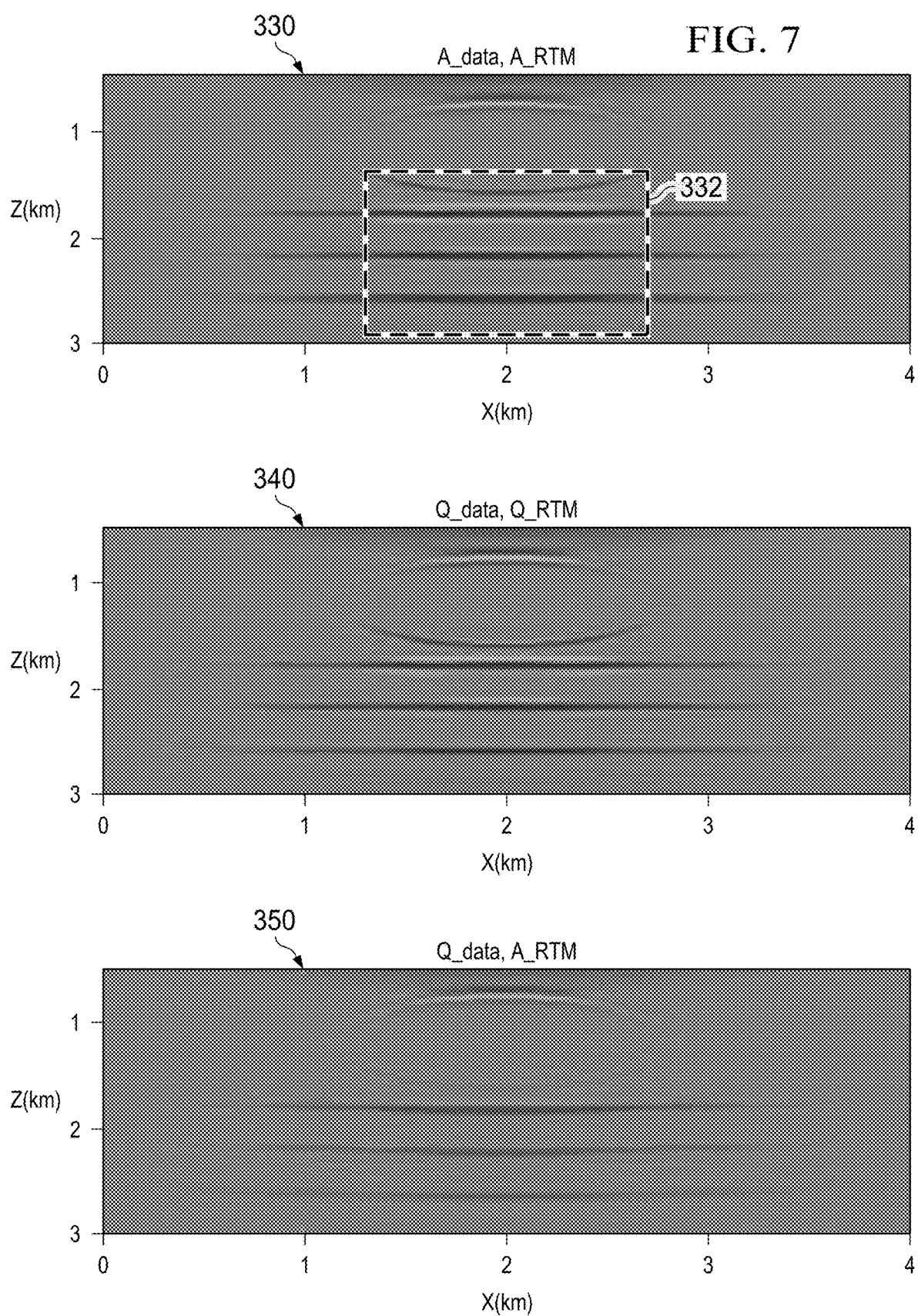
FIG. 7 shows example data generated from reverse time migration (RTM) of the data from FIG. 6.

FIG. 7 shows example data generated from reverse time migration (RTM) of the data from FIG. 6 are shown. The VARTM and ARTM are performed by the data processing system 250 on these data 310 and 320. The graphs 330, 340, and 350 show the migration results of the VARTM and the ARTM. Graph 330 is the ARTM result using the acoustic data as input. Graph 340 is the VARTM result using visco-acoustic data as input. As shown, graphs 330 and 340 represent two results that are very similar. Graph 350 shows ARTM using the visco-acoustic data. Graph 350 shows image distortion at the lower boundary of the lens body and also the layers below the lens body.

Figure 8:
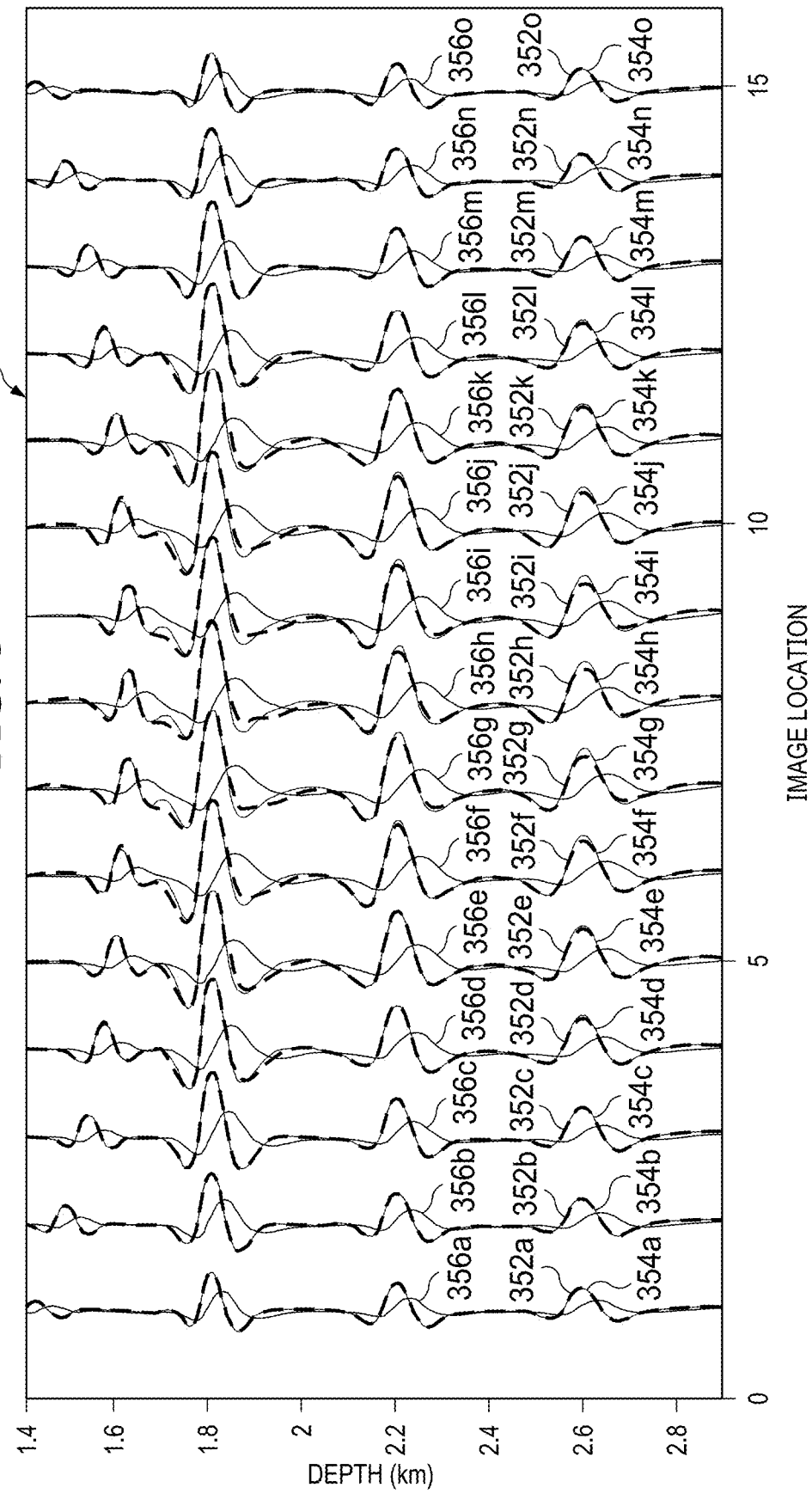
FIG. 8 shows a portion of the data of FIG. 7 with a zoomed-in view.

FIG. 8 shows a portion 350 of the data of graph 330 of FIG. 7 with a zoomed-in view. The portion 350 of the data of graph is shown by dashed line 332 in graph 330. The consistent results between the VARTM results 352*a-o* using visco-acoustic data and black dashed line ARTM result 354*a-o* using acoustic data validate the invented VARTM method. The traces 556*a-o* represent acoustic RTM using the visco-acoustic data.

Figure 9:
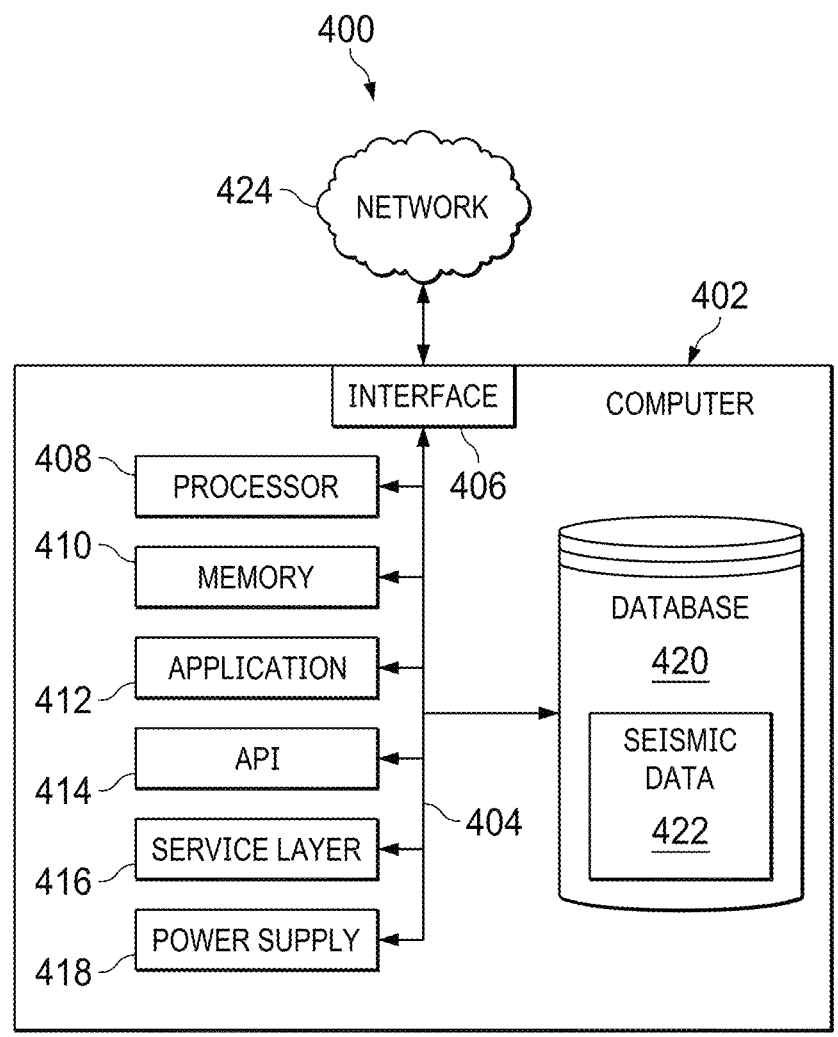
FIG. 9 is a diagram of an example computing system.

FIG. 9 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402. The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 17, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 17, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 17, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 17, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or non-rechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system previously described. Accordingly, other embodiments are within the scope of the following claims.

What is claimed is:

1. A method for generating a seismic image representing a subsurface formation by compensating for distortions of seismic data, the method comprising:
   receiving seismic data for the subsurface formation, including receiver wavelet data and source wavelet data;
   generating source wavefield data based on a forward modeling of the source wavelet data;
   generating receiver wavefield data that compensates for distortions in the seismic data by:
      applying a dispersion-only model to the receiver wavelet data to generate a first reconstructed back-propagated receiver wavefield portion, wherein the dispersion-only model comprises applying a wave equation to the receiver wavelet, the wave equation comprising:

$$\frac{\partial^2 p}{\partial t^2} + \bar{v}_e^{\frac{2}{1-\gamma}} k^{\frac{2}{1-\gamma}} p = s(t), \text{ where } \bar{v}_e = \frac{v_0}{(\omega_0)^\gamma}.$$

wherein p represents an acoustic pressure value, wherein $v_0$ represents an initial velocity value, wherein $\omega_0$ represents an initial angular frequency value, wherein γ represents a constant value, wherein k represents a wavenumber, and wherein t represents time;
   applying a dissipation-only model to the receiver wavelet data to generate a second reconstructed back-propagated receiver wavefield portion; and
   combining the first back-propagated receiver wavefield portion and the second back-propagated receiver wavefield portion into the receiver wavefield data;
   applying an imaging condition to the receiver wavefield data and the source wavefield data;
   generating, based on applying the imaging condition, visco-acoustic reverse time migration (VARTM) result data;
   based on the VARTM result data, generating a seismic image of the subsurface formation; and
   based on the seismic image, drilling into the subsurface formation.

2. The method of claim 1, wherein the forward modeling of the source wavelet data comprises applying a complex value velocity model to the source wavelet data.

3. The method of claim 2, wherein the complex velocity model comprises a generalized visco-acoustic wave Equation $$\frac{\partial^2 p_h}{\partial t^2} + v_e^{\frac{2}{1-\gamma}} k^{\frac{2}{1-\gamma}} p_h = s_h(t), \text{ wherein } v_e = \frac{v_0}{\omega_0^\gamma [1 + i \tan(\frac{\pi\gamma}{2})]},$$

wherein $S_h = S+i[-i \, sgn(\omega)S]$ is the inverse Fourier transform of $s_h(t)$, and wherein $P_h = P+i[-i \, sgn(\omega)P]$, is the inverse Fourier transform of $p_h(t)$.

4. The method of claim 1, wherein the dissipation-only model comprises applying a wave equation to the receiver wavelet, the wave equation comprising:

$$\frac{\partial^2 p_h}{\partial t^2} + \tilde{v}_e^2 k^2 p_h = s_h(t), \text{ where } \tilde{v}_e = \frac{v_0}{1 - i \tan(\frac{\pi\gamma}{2})},$$

where $S_h = S+i[-i \, sgn(\omega)S]$ is the inverse Fourier transform of $s_h(t)$, and where $P_h = P+i[-i \, sgn(\omega)P]$ is the inverse Fourier transform of $p_h(t)$.

5. The method of claim 1, wherein combining the first back-propagated receiver wavefield portion and the second back-propagated receiver wavefield portion into the receiver wavefield data comprises performing the following combination $$\bar{S}(x_S, \omega) = \left|\frac{S_2(x_S, \omega)}{S_1(x_S, \omega)}\right| S_2(x_S, \omega),$$

where $S_1(x_S,\omega) = e^{(i\varphi)} e^{-2\alpha(\omega)r} S(x_S,\omega)$ comprises the first reconstructed back-propagated receiver wavefield portion and wherein $S_2(X_S, \omega) = e^{-\alpha(\omega)r} S(X_S, \omega)$ comprises the second reconstructed back-propagated receiver wavefield portion.

6. The method of claim 1, wherein the imaging condition comprises a deconvolution imaging condition.

7. A system for generating a seismic image representing a subsurface formation by compensating for distortions of seismic data, the system comprising:
   one or more processing devices; and
   a memory in communication with the one or more processing devices, the memory configured to store instructions that, when executed by the one or more processing devices, cause the one or more processing devices to perform operations comprising:
      receiving seismic data for the subsurface formation, including receiver wavelet data and source wavelet data;
      generating source wavefield data based on a forward modeling of the source wavelet data;
      generating receiver wavefield data that compensates for distortions in the seismic data by:
         applying a dispersion-only model to the receiver wavelet data to generate a first reconstructed back-propagated receiver wavefield portion, wherein the dispersion-only model comprises applying a wave equation to the receiver wavelet, the wave equation comprising:

$$\frac{\partial^2 p}{\partial t^2} + \bar{v}_e^{\frac{2}{1-\gamma}} k^{\frac{2}{1-\gamma}} p = s(t), \text{ where } \bar{v}_e = \frac{v_0}{(\omega_0)^\gamma}.$$

wherein p represents an acoustic pressure value, wherein $v_0$ represents an initial velocity value, wherein $\omega_0$ represents an initial angular frequency value, wherein $\gamma$ represents a constant value, wherein k represents a wavenumber, and wherein t represents time;

applying a dissipation-only model to the receiver wavelet data to generate a second reconstructed back-propagated receiver wavefield portion; and combining the first back-propagated receiver wavefield portion and the second back-propagated receiver wavefield portion into the receiver wavefield data;

applying an imaging condition to the receiver wavefield data and the source wavefield data;

generating, based on applying the imaging condition, visco-acoustic reverse time migration (VARTM) result data;

based on the VARTM result data, generating a seismic image of the subsurface formation; and based on the seismic image, causing drilling to be performed into the subsurface formation.

8. The system of claim 7, wherein the forward modeling of the source wavelet data comprises applying a complex value velocity model to the source wavelet data.

9. The system of claim 8, wherein the complex velocity model comprises a generalized visco-acoustic wave Equation $$\frac{\partial^2 p_h}{\partial t^2} + v_e^{\frac{2}{1-\gamma}} k^{\frac{2}{1-\gamma}} p_h = s_h(t), \text{ wherein } v_e = \frac{v_0}{\omega_0^\gamma [1 + i \tan(\frac{\pi\gamma}{2})]},$$

wherein $S_h = S + i[-i\, \text{sgn}(\omega)S]$ is the inverse Fourier transform of $s_h(t)$, and wherein $P_h = P + i[-i\, \text{sgn}(\omega)P]$, is the inverse Fourier transform of $p_h(t)$.

10. The system of claim 7, wherein the dissipation-only model comprises applying a wave equation to the receiver wavelet, the wave equation comprising:

$$\frac{\partial^2 p_h}{\partial t^2} + \bar{v}_e^2 k^2 p_h = s_h(t), \text{ where } \bar{v}_e = \frac{v_0}{1 - i \tan(\frac{\pi\gamma}{2})},$$

where $S_h = S + i[-i\, \text{sgn}(\omega)S]$ is the inverse Fourier transform of $s_h(t)$, and where $P_h = P + i[-i\, \text{sgn}(\omega)P]$ is the inverse Fourier transform of $p_h(t)$.

11. The system of claim 7, wherein combining the first back-propagated receiver wavefield portion and the second back-propagated receiver wavefield portion into the receiver wavefield data comprises performing the following combination $$\bar{S}(x_S, \omega) = \left|\frac{S_2(x_S, \omega)}{S_1(x_S, \omega)}\right| S_2(x_S, \omega),$$

where $S_1(x_S,\omega) = e^{(i\varphi)} e^{-2\alpha(\omega)r} S(x_S,\omega)$ comprises the first reconstructed back-propagated receiver wavefield portion and wherein $S_2(x_S,\omega) = e^{-\alpha(\omega)r} S(x_S,\omega)$ comprises the second reconstructed back-propagated receiver wavefield portion.

12. The system of claim 7, wherein the imaging condition comprises a deconvolution imaging condition.

13. One or more non-transitory computer readable media storing instructions for generating a seismic image representing a subsurface formation by compensating for distortions of seismic data, the instructions configured to cause one or more processing devices that execute the instructions to perform operations comprising:

receiving seismic data for the subsurface formation, including receiver wavelet data and source wavelet data;

generating source wavefield data based on a forward modeling of the source wavelet data;

generating receiver wavefield data that compensates for distortions in the seismic data by:

applying a dispersion-only model to the receiver wavelet data to generate a first reconstructed back-propagated receiver wavefield portion, wherein the dispersion-only model comprises applying a wave equation to the receiver wavelet, the wave equation comprising:

$$\frac{\partial^2 p}{\partial t^2} + \bar{v}_e^{\frac{2}{1-\gamma}} k^{\frac{2}{1-\gamma}} p = s(t), \text{ where } \bar{v}_e = \frac{v_0}{(\omega_0)^\gamma}.$$

wherein p represents an acoustic pressure value, wherein $v_0$ represents an initial velocity value, wherein $\omega_0$ represents an initial angular frequency value, wherein $\gamma$ represents a constant value, wherein k represents a wavenumber, and wherein t represents time;

applying a dissipation-only model to the receiver wavelet data to generate a second reconstructed back-propagated receiver wavefield portion; and combining the first back-propagated receiver wavefield portion and the second back-propagated receiver wavefield portion into the receiver wavefield data;

applying an imaging condition to the receiver wavefield data and the source wavefield data;

generating, based on applying the imaging condition, visco-acoustic reverse time migration (VARTM) result data;

based on the VARTM result data, generating a seismic image of the subsurface formation; and based on the seismic image, causing drilling to be performed into the subsurface formation.

14. The one or more non-transitory computer readable media of claim 13, wherein the forward modeling of the source wavelet data comprises applying a complex value velocity model to the source wavelet data.

15. The one or more non-transitory computer readable media of claim 14, wherein the complex velocity model comprises a generalized visco-acoustic wave Equation $$\frac{\partial^2 p_h}{\partial t^2} + v_e^{\frac{2}{1-\gamma}} k^{\frac{2}{1-\gamma}} p_h = s_h(t), \text{ wherein } v_e = \frac{v_0}{\omega_0^\gamma \left[1 + i \tan\left(\frac{\pi\gamma}{2}\right)\right]},$$

wherein $S_h = S + i[-i \operatorname{sgn}(\omega)S]$ is the inverse Fourier transform of $s_h(t)$, and wherein $P_h = P + i[-i \operatorname{sgn}(\omega)P]$, is the inverse Fourier transform of $p_h(t)$.

16. The one or more non-transitory computer readable media of claim 13, wherein the dissipation-only model comprises applying a wave equation to the receiver wavelet, the wave equation comprising:

$$\frac{\partial^2 p_h}{\partial t^2} + \breve{v}_e^2 k^2 p_h = s_h(t), \text{ where } \breve{v}_e = \frac{v_0}{1 - i \tan\left(\frac{\pi\gamma}{2}\right)},$$

where $S_h = S + i[-i \operatorname{sgn}(\omega)S]$ is the inverse Fourier transform of $s_h(t)$, and where $P_h = P + i[-i \operatorname{sgn}(\omega)P]$ is the inverse Fourier transform of $p_h(t)$.

17. The one or more non-transitory computer readable media of claim 13, wherein combining the first back-propagated receiver wavefield portion and the second back-propagated receiver wavefield portion into the receiver wavefield data comprises performing the following combination $$\overline{S}(x_S, \omega) = \left|\frac{S_2(x_S, \omega)}{S_1(x_S, \omega)}\right| S_2(x_S, \omega),$$

where $S_1(x_s,\omega) = e^{(i\varphi)} e^{-2\alpha(\omega)r} S(x_S,\omega)$ comprises the first reconstructed back-propagated receiver wavefield portion and wherein $S_2(x_S,\omega) = e^{-\alpha(\omega)r} S(x_S,\omega)$ comprises the second reconstructed back-propagated receiver wavefield portion.

* * * * *